United States Patent Office 3,238,735
Patented Mar. 8, 1966

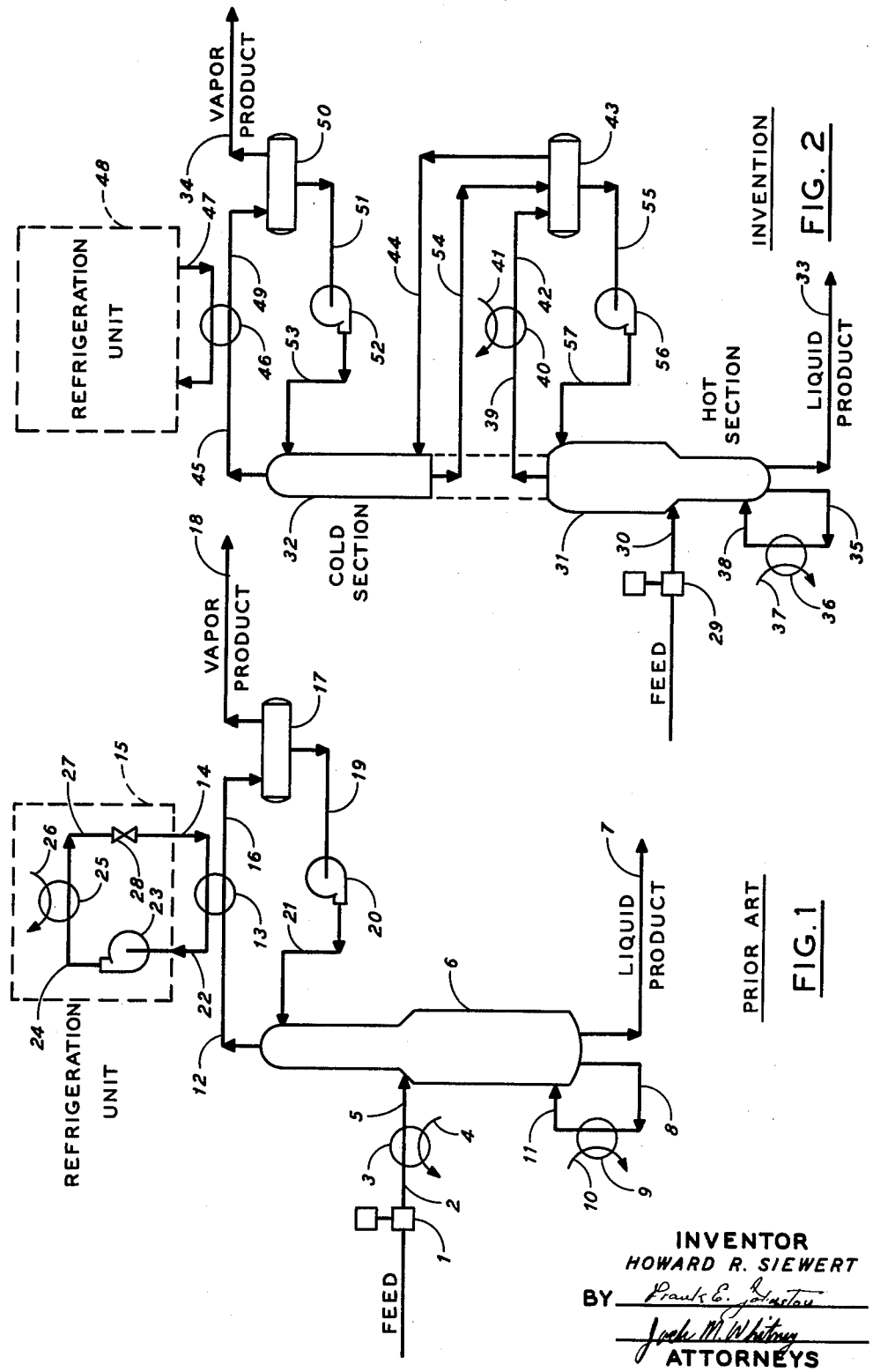
March 8, 1966    H. R. SIEWERT    3,238,735
DISTILLATION OF LOW-BOILING COMPONENTS
Filed Dec. 5, 1962
INVENTOR
HOWARD R. SIEWERT
BY
ATTORNEYS

3,238,735
DISTILLATION OF LOW-BOILING COMPONENTS
Howard R. Siewert, Lafayette, Calif., assignor to Chevron Research Company, a corporation of Delaware
Filed Dec. 5, 1962, Ser. No. 242,477
8 Claims. (Cl. 62—28)

This invention relates to distillation. More particularly, the invention relates to the separation of a low-boiling normally-gaseous component or components from a mixture containing a higher-boiling component or components by fractionation. In one embodiment the invention relates to a process for fractionating hydrocarbon vapors derived from petroleum processing to separate normally gaseous material, such as hydrogen, methane, and ethane, from propane and higher-boiling hydrocarbons. In this context, the term "hydrocarbon vapors" is often used herein to include also hydrogen and other gaseous byproducts found in gases produced during hydrocarbon processing.

Fractionation is accomplished by countercurrent vapor-liquid contacting in a fractionation zone comprising one or more columns wherein is imposed a temperature gradient, increasing from top to bottom, by refluxing. Vapors are generated at the bottom to ascend through perforated plates, bubble-cap trays, packing, or other distributing means to contact descending liquid, which is supplied at the top by condensing all or a portion of the overhead vapors and returning all or a portion of the condensate as reflux. Based on physical data for the system, the actual number of contact stages required to accomplish a desired separation and the best point for introducing the feed can be estimated by known methods. An important variable in the calculations is the ratio of reflux to feed.

Often the feed stream to be distilled contains very low-boiling components, and it is desired to recover a vapor product containing no more than a set maximum concentration of some slightly higher-boiling component. It may then be necessary to supply the liquid reflux at the top by partially condensing the overhead vapors at a low temperature, i.e., below atmospheric, such that refrigeration is needed to accomplish the condensation. The distillation process then becomes quite expensive to build and to operate, especially if a high reflux ratio is required.

The present invention provides an improved distillation scheme for separating components under the above circumstances. The invention minimizes or reduces the refrigeration duty and/or the work required of the refrigeration unit, and provides numerous other benefits in many instances, including improved process operability and control and reduced equipment and operating costs, as will be apparent from the description herein.

The attached drawing depicts schematically the use of the invention in an exemplifying embodiment, as contrasted with the prior art. More detailed reference to the drawing will be made later. Briefly, however, FIG. 1 represents a prior are deethanizer, and FIG. 2 represents a deethanizer embodying the invention. As shown, a major distinguishing feature of the invention is that the fractionation zone is divided into a relatively hot first section and a relatively cold second section, and vapors can pass from the hot section to the cold section only by passing through a heat exchanger wherein heat is removed from the vapors.

In accordance with one embodiment of the invention, refrigeration work requirements are minimized in a process for separating a lower-boiling component from a higher-boiling component comprising a fractionation zone wherein refrigerant cooling is needed to supply top reflux at a temperature below atmospheric in order to keep the concentration of higher-boiling components in the overhead below a set maximum, by withdrawing all upflowing vapor from the fractionation zone at a temperature substantially above atmospheric and partially condensing the withdrawn vapor without refrigeration. The condensed material is returned to the fractionation zone. The uncondensed material is passed to a rectification section of the distillation zone and flows upward to contact downflowing top reflux.

The ultimate heat transfer medium for removing heat from the vapor to partially condense it without refrigeration will generally be cooling water, circulated through a cooling tower and thereby made available at a temperature near atmospheric. Under ideal conditions the water temperature may approach the air wet bulb temperature. Refrigeration refers to achieving lower temperatures than any naturally obtainable in the surroundings, and involves performing work.

In a preferred embodiment, the invention is applied in a fractionation process for recovering product vapor containing no more than about 10% by volume of hydrocarbons higher boiling than ethane from a feed stream containing propane and an amount of hydrogen and hydrocarbons lower boiling than propane such that refrigerant cooling is need to supply top reflux at a low enough temperature to keep the concentration of higher boiling hydrocarbons below 10% in the vapor. In a still more preferred embodiment the invention provides a process for recovering liquefied petroleum gas as a bottoms liquid product stream, by distillation of a hydrocarbon feed stream containing propane and lower-boiling components, which maximizes the propane recovery by minimizing the concentration of propane in the overhead without the use of more than a minimal amount of refrigeration. The feed is introduced into a fractionation zone at a point intermediate the top and the bottom, and a temperature profile or gradient, increasing from top to bottom, is imposed by introducing refrigerant-cooled reflux near the top and reboiled vapors near the bottom. All upflowing vapors are withdrawn at a point where the temperature is above that of available cooling water so that the withdrawn vapors can be partially condensed by heat transfer to the cooling water. The resulting condensate is returned at the point of vapor withdrawal or below, e.g., the tray below the vapor space from which vapors were withdrawn. The uncondensed vapor is returned at a higher point, e.g., below the next-above tray.

In another embodiment the invention comprises a first fractionation zone and a second fractionation zone cooperatively interconnected so that vapors are prevented from passing directly from the first fractionation zone to the second fractionation zone although liquid can pass directly from the second fractionation zone to the first fractionation zone. The vapor can only pass from the first zone to the second zone by passing through external means for removing heat from the vapor by partial condensation thereof. The overhead of the first fractionation zone is partially condensed to obtain a first reflux condensate and a gas. The gas is introduced into the second fractionation zone. The overhead of the second fractionation zone is partially condensed to obtain a second reflux condensate, which is returned to the second zone, and a product gas stream. The first reflux condensate and the liquid bottoms stream from the second fractionation zone are passed to the first fractionation zone. Liquid product is withdrawn from the bottom of the first zone.

It is believed that one reason why this new approach to the problem of fractionating low-boiling vapors has not heretofore been tried is that distillation calculations in a multi-component system are so extremely complicated and tedious even in the design of conventional units that introducing further complications is studiously avoided. In fact, standardized methods of solving fractionation problems are taught wherein, whether plate-by-plate calculations or graphical methods are used, it is first necessary to select a reflux rate at a set operating pressure. Then either the number of theoretical stages required to achieve the separation set by material balance, or the separation attainable in a set number of stages, is determined. By repeated trials with different reflux rates the optimum column dimensions and operating conditions can be arrived at. Where machine or electronic calculators are used to speed the work, such a standardized approach is built-in in the program. Thus the possibility of using anything other than conventional fractionation is excluded before even beginning work on the problem, because otherwise it is not readily apparent how to proceed.

It is surprising that removing heat from the upflowing vapor at an intermediate point in the distillation in accordance with the invention improves the process, because the objects of the preferred process to which the invention applies are to remove as much as possible of the light normally-gaseous materials from the bottoms liquid, while minimizing losses in the overhead. Cooling the liquid at an intermediate point in the column would tend to increase the solubility of light material in the downflowing liquid, and to decrease the vapor traffic. The decreased traffic above the intercooling would tend to decrease the fractionation per tray and thereby require more trays. The partial condensation of withdrawn upflowing vapor in accordance with the invention, however, returns the condensate to the fractionation zone at the point of withdrawal at its bubble point. In the new process heat is removed from the system by partial condensation of vapors at a point at which a significant portion of the fractionation has already been accomplished such that the decreased vapor and liquid traffic does not require using an inordinate number of trays in the refrigerated upper, or rectification, section to produce the desired overhead product. The maximum vapor and liquid traffics in the section of column between the point of feed introduction and the point of vapor withdrawal are less than in the conventional case with a vapor feed because the temperature drop from the feed to that point is less. Consequently, a smaller column diameter can be used. Also, the molecular weight of the vapor in this section is higher than in the conventional case, which also reduces column diameter.

Referring to the attached drawing, the invention and the manner of using it will be explained and illustrated by means of an example which presents a comparison with the prior art.

*Example feed and products*

From the distillation of crude petroleum, the distillation of products of a catalytic reforming process, and the distillation of products of a catalytic hydrocracking process there are obtained light hydrocarbon vapors boiling at a temperature less than the initial boiling point of the gasoline products. These vapor streams are composed principally of hydrogen, methane, ethane, propane, and butanes. Some of the hydrogen appeared as a byproduct in the catalytic reforming operations, and some was dissolved in the products from the catalytic hydrocracking process. The butane and any heavier components of the vapor streams are recovered by distillation, or otherwise, for blending or conversion into light gasoline or other products. For example, there is thus obtained from a depropanizer or light ends rectifier a light hydrocarbon vapor stream having the following composition:

| | Mol percent |
|---|---|
| Hydrogen | 7 |
| Methane | 14 |
| Ethane | 22 |
| Propane | 56 |
| Isobutane | 1 |

It is desired to recover the propane from this vapor feed for sale as liquefied petroleum gas, and also to recover the normally gaseous lower-boiling components as a substitute for, or supplement to, the natural gas feed to a steam-methane reforming process for manufacturing hydrogen, which hydrogen is to be supplied to the catalytic hydrocracking process. This separation can be accomplished by fractionation, to recover products having the following compositions:

| Component | Product Liquid | Product Vapor |
|---|---|---|
| Mol percent hydrogen | Nil | 15.4 |
| Mol percent methane | Nil | 32 |
| Mol percent ethane | 3.2 | 46.3 |
| Mol percent propane | 95.1 | 6.3 |
| Mol percent isobutane | 1.7 | Nil |
| Mol Ratio to Feed, Total | 0.56 | 0.44 |

*Prior art example*

For example, in FIG. 1, the feed vapors are compressed in compressor 1 to about 500 p.s.i.a. and 160° F. in line 2 and then cooled in heat exchanger 3 by cooling water in line 4 to about 100° F., at which conditions the feed is partially vaporized, and passed through line 5 to column 6, which has a diameter of about 5 feet below the feed and 4½ feet above the feed and contains about 35 bubble-cap trays. Product liquid having the above composition is withdrawn from the bottom of the column through line 7, and the composition is controlled by controlling the temperature near the bottom at about 185° F. by withdrawing a portion of bottoms through line 8 and passing it through reboiler 9, wherein it is heated and partially vaporized by heat transfer from stream in line 10 to provide hot vapors returned to the column through line 11. The temperature of the overhead vapor withdrawn from the column through line 12 is about 85° F., a situation which is achieved by partially condensing the overhead vapors in condenser 13 by means of cold refrigerant supplied into line 14 from the refrigeration unit shown by block 15. The vapors are condensed at a temperature of about 22° F. to provide a mixed vapor-liquid stream which passes through line 16 to reflux drum 17. From drum 17 cold liquid reflux is withdrawn in line 19 and returned to the column by pump 20 through line 21. Product vapors having the composition previously described are recovered through line 18. The mol ratio of reflux in line 21 to feed in line 2 is about 0.75. About 10.2 tons of refrigeration is required per 1000 pounds per hour of feed to accomplish the partial condensation in condenser 13.

Elevated pressure is used in the distillation in order that a liquid phase will be present at the overhead temperature and composition. If a lower pressure is used, a much lower reflux temperature must be provided, which increases the refrigeration cost. If it is attempted to use a higher pressure, so that the overhead condensing may be accomplished at a higher temperature by means of cooling water, a situation is soon reached at which the material in the bottom of the column is at its critical temperature, and it is not possible to make any separation by fractionation. If cooling water is available at 85° F., a degree of fractionation is possible such that the recovery of propane in the liquid bottoms product is about 60%, as compared to 95% recovery with a reflux temperature of 22° F., the loss in yield appearing as an excessively high propane concentration in the vapor product. It is desired to keep the concentration of propane in the vapor product below about 10 mol percent because, as mentioned, it is proposed to use this gas as feed to a reforming process for hydrogen manufacture. When higher molecular-weight hydrocarbons such as propane are present in the gas, much greater amounts of steam are required in the reformer and the problem of coking and reforming catalyst deactivation is aggravated. Also, of course, it is desired to recover the maximum amount of the valuable propane as liquefied petroleum gas in the bottoms.

*Example using the invention*

In accordance with the invention as in FIG. 2, the hydrocarbon vapor feed is compressed by compressor 29 to about 500 p.s.i.a. and 160° F., and passed through line 30 into a fractionation zone, which is divided into a relatively hot section 31 for countercurrent vapor-liquid contacting and a relatively cold section 32 for countercurrent vapor-liquid contacting. Hot section 31 has a diameter of about 4½ feet below the feed to 5 feet above the feed and contains about 25 bubble-cap trays, while cold section 32 has a diameter of about 3½ feet and contains about 15 bubble-cap trays. The feed is essentially completely vaporized. Product liquid propane of the desired composition is recovered through line 33 from the bottom of section 31 at about 187° F., its purity being controlled by withdrawing a portion of liquid bottoms through line 35 and passing it through reboiler 36 whereby it is at least partially vaporized by heat transfer from steam supplied in line 37 to provide reboiled vapors which are returned to section 31 through line 38 to pass upward through the column. The vapors ascend through the bubble-caps in the trays in section 31 countercurrent to downflowing liquid flowing across each tray. Line 39 directs the overhead vapors of section 31 through condenser 40, wherein the vapors are partially condensed by heat transfer to cooling water passed through the condenser by line 41. There is thereby obtained a condensate and a gas which pass through line 42 to receiver 43. From receiver 43 the condensate is withdrawn through line 55 and returned as reflux to section 31 by pump 56 and line 57. The uncondensed vapors or gas are passed from receiver 43 to cold section 32 via line 44. Thus, vapors can pass from section 31 to section 32 only by passing through partial condenser 40, wherein heat is removed from the vapor. The temperature of the vapors in line 39 is about 135° F., and the temperature of the liquid in receiver 43 is about 95° F. The amount of sensible heat removed by cooling is quite small in comparison to the much larger amount of latent heat removed by condensing.

In section 32 the vapors introduced through line 44 pass upward countercurrent to descending liquid provided by cold reflux introduced at the top through line 53. Reflux is provided by withdrawing overhead vapors from section 32 through line 45, partially condensing the vapors in condenser 46 by heat transfer to cold refrigerant passed through the exchanger by line 47 from the refrigeration unit shown by block 48. There is thus obtained a mixture of condensate and vapors in line 49 which passes to reflux drum 50 at a temperature of about 22° F. The vapors in line 45 are at a temperature of about 60° F. Only about 5.4 tons of refrigeration is required per 1000 pounds per hour of feed to accomplish the partial condensation in order to provide the necessary reflux in line 53, in a mol ratio to feed in line 30 of about 0.4. The uncondensed vapors are recovered as the normally-gaseous product stream in line 34, having the desired composition as previously set forth. Liquid reflux flowing down through section 32 is enriched by the upflowing vapors to provide an enriched reflux which is withdrawn as liquid bottoms from section 32 through line 54 and passed to receiver 43. This material also passes as liquid reflux via lines 55 and 57 to the top of section 31. There is thus a direct route for flow of liquid from section 32 to section 31. The mol ratio of total liquid in line 57 to feed in line 30 is about 1.2.

The cost of the equipment in the embodiment of the invention shown in FIG. 2, including the feed gas compressor, is less than 90% of the cost of the equipment required in the prior art apparatus of FIG. 1. Also, the operating cost of the process using the invention as illustrated in FIG. 2 is less than 75% of the operating cost of the prior art process of FIG. 1. These savings are primarily due to the reduced refrigeration work and smaller unit required to supply the cold reflux. Although a greater total number of trays is required in the distillation columns in the invention, the columns have a smaller average diameter, so that the total cost of the columns is not substantially different from that of the single column employed in the prior art process of FIG. 1. The reduced operating cost arises not only because much less power is required in refrigeration unit 48 but also because the amount of water circulation required in partial condenser 40 plus that required to recondense the refrigerant is significantly less than the cooling water required to recondense the refrigerant in refrigeration unit 15 and to partially condense the feed of FIG. 1.

The feed to the deethanizer of FIG. 1 is partially liquid because that has been determined to be the optimum, most economical, operation within the prior art when fractionating the particular feed exemplified. If the feed in FIG. 1 is totally vaporized, as in FIG. 2, the work and heat removal required in refrigeration unit 15 are increased so that the relative savings in investment and operating cost attained by using the deethanizer of FIG. 2 are even greater (20% and 40%, respectively) than in the foregoing comparative examples. On the other hand, little or no advantage is gained by partially condensing the feed in the embodiment of FIG. 2 because that increases the reboiler duty and only slightly decreases the duty in condenser 40.

The refrigeration unit employed in connection with the fractionation forms in itself no part of this invention, but may be any conventional means for producing low temperatures, i.e., temperatures below atmospheric. FIG. 1 shows a common refrigeration unit which achieves a low temperature by flashing through valve 28 a liquid from a high pressure in line 27 to a low pressure in line 14 with resulting partial vaporization and auto-refrigeration, and heat can then be absorbed from the warmer stream 12 in exchanger 13 to complete the vaporization of the refrigerant into line 22 at the low temperature. The refrigerant is then recompressed by compressor 23 and passed by line 24 through exchanger 25, where it is recondensed by heat transfer to cooling water in line 26 to provide the liquid in line 27. In the comparison of equipment and operating costs for the new process of FIG. 2 as compared to FIG. 1, refrigeration unit 48 is exactly the same type as unit 15, though, of course, only about half as large.

The usual refrigerant mediums are light hydrocarbons such as propane, ammonia, and the Freons. It is also possible to produce a heat transfer medium at a low temperature by expansion of a non-ideal gas, taking advantage of the Joule-Thompson effect. Other equivalent means can be devised, but all require doing work to obtain a low temperature medium to absorb heat, and then removing the heat absorbed.

The fractionation zone of the invention need not be separated into two distinct distillation columns as in FIG. 2, but may comprise a single column with the cold section mounted directly above the hot section (indicated by the dotted lines). However, means must be provided for preventing vapor from flowing directly from the hot section to the cold section. For example, an imperforate plate may divide the hot section from the cold section. External conduit means are then provided for passing vapor from the vapor space above the top tray of the hot section to below the bottom tray of the cold section after first passing through a partial condenser for removing heat from the vapor. In some cases, liquid may be permitted to flow from the cold section to the hot section by a downcomer from the bottom tray of the cold section to the top tray of the hot section, which downcomer or other conduit means is sealed at the bottom by a liquid level, to prevent vapor from bypassing upward into the cold section. Usually, however, an inordinately long downcomer would be required because the pressure difference between the two sections must be greater than that across a single tray to force the vapor to flow through the condenser. A blower could be used, but it is generally more economical to pump the liquid than the vapor.

It will be recognized that, instead of a single column or two distinct columns, multiple parallel columns or sections may be provided, for example, where large amounts of gas are to be processed, without departing from the spirit and scope of the invention.

The terms "hot section" and "cold section" do not imply any particular absolute temperatures but only a relative difference in mean temperatures. All temperatures in the hot section will, however, be above atmospheric, and at least the reflux to the cold section will be below atmospheric.

A condensate receiver, such as receiver 43 of FIG. 2, is not essential to the invention, but it is a part of the preferred embodiment in that it permits better control of the operation. Also, it is desired to return the condensed liquid to the top of the hot section together with the liquid from the bottom of the cold section, so that only one pump is needed. Also, the receiver acts as another distillation stage when liquid from the cold section is added.

The provision of a receiver is also preferred where the objective is to produce purified liquid petroleum gas as the bottoms product from the hot section because it permits greater flexibility in operation. In installations of this type, hydrates and ice sometimes accumulate in the cold refrigerated portion of the system and may eventually cause plugging and other operating difficulties. In the prior art process it is then necessary to shut down the entire unit for cleaning and thawout. In the embodiment shown, the cold section may be shut down independent of the hot section and liquefied petroleum gas be continually produced, albeit at a lower yield. For instance, the partial condenser 40 may serve as the column overhead condenser with the vapors in line 44 being withdrawn as the overhead product. The vapors will, of course, contain significant amounts of propane above that ordinarily desired therein, and the propane recovery will be correspondingly reduced, but this is often preferable to a complete shutdown and failure to produce any product at all.

Also, the unit may be installed in stages to spread the total capital investment over a time, and thereby increase actual return on investment, by first constructing the hot section and water cooled overhead reflux system, and used in that form until such time as greater demand for liquefied petroleum gas develops. The cold section can then be added on at a later date to provide the desired greater liquid product recovery. This is only possible, however, if the process is originally designed with the further expansion in mind, because otherwise it will be found that the proper point for dividing the sections was not selected and/or that the partial condenser is incorrectly sized. It should be recognized that the conditions at the top of section 31 will be changed when section 32 is added and cold enriched liquid is passed through line 54.

The point at which the cold section is divided from the hot section by withdrawing the upflowing vapor is determined by the existence at that point of a temperature above that attainable by available cooling water. The higher the temperature at the point selected, i.e., the closer to the feed tray it is, the greater the number of trays which will be required in the upper or cold rectification section, but the more readily the heat can be removed from the withdrawn vapor. In general, to minimize refrigeration work, it is best to withdraw the upflowing vapor at the highest possible point in the process, i.e., at the lowest temperature consistent with still being able to partially condense the vapor without refrigeration in a condenser of reasonable heat transfer surface area.

The invention applies to systems wherein it is desired to remove normally-gaseous components from mixtures containing condensible components to produce either a relatively pure stream of noncondensible gases or a liquid stream free of noncondensibles, or to achieve both objectives. The example herein is clearly intended to be nonlimiting. Thus, instead of removing propane and heavier hydrocarbons from the original gas stream in a depropanizer or light-ends rectifier prior to feeding to the deethanizer illustrated, the original stream could be treated in accordance with the invention to recover the light gases, and the liquid bottoms containing propane and heavier hydrocarbons could then be redistilled to recover the propane. Also, other vapor streams derived from other sources may be distilled to advantage in accordance with the invention when the same factors including the need for a low reflux temperature prevail. The invention is particularly advantageous, however, when used to recover high purity propane from light by product gases derived from a low temperature acidic hydrocracking process for converting gas oils to gasoline at elevated pressure, wherein there is a net production of propane, much less ethane, and an unusually small amount of methane. The byproduct gases will, however, contain hydrogen and methane (introduced as an impurity with the hydrogen) which were dissolved in the hydrocracked oil. Consequently, the light gases have an unusual composition in that the ethane content is often less than both the methane and the propane so that refrigeration is essential to prevent excess propane losses in the hydrogen and methane, but the separation of propane from ethane is readily accomplished.

I claim:

1. In a process for separating a lower boiling component of a distillable mixture from a higher-boiling component thereof, comprising feeding said mixture to a fractionation zone operated at a pressure at which said higher-boiling component is condensible at a temperature obtainable by cooling water in the surroundings, with drawing an overhead vapor product comprising said lower-boiling component and withdrawing a bottoms liquid product comprising said higher boiling component, wherein upflowing vapors are generated by heating below the feed point to a temperature substantially above atmospheric in order to keep the concentration of lower-boiling component in the bottoms liquid product below a set maximum, and wherein refrigeration means is used to supply top reflux at a lower temperature than is naturally obtainable in the surroundings in order to keep the concentration of higher-boiling component in the overhead vapor product below a set maximum;

the improvement for minimizing the refrigeration work, which comprises:

withdrawing all upflowing vapor from the fractionation zone at a point above the feed point where the temperature is substantially above atmospheric, partially condensing the withdrawn vapor at a temperature obtainable by cooling water in the surroundings, passing only the uncondensible portion of the withdrawn vapor to a rectification section of said fractionation zone above the point of vapor withdrawl for countercurrent contact therein with downflowing top reflux supplied by said refrigeration means, and returning the resulting condensed portion of the withdrawn vapor to the fractionation zone between the feed point and the point of vapor withdrawl.

2. A process as defined in claim 1 wherein said distillable mixture is fed as a vapor to said fractionation zone.

3. The process of claim 1 wherein the resulting condensed portion of the withdrawn vapor and liquid bottoms from said rectification section are returned to the fractionation zone at the point of vapor withdrawal.

4. The process of claim 1 wherein said lower boiling component comprises at least one of the normally gaseous petroleum byproducts hydrogen, methane, and ethane, and said higher-boiling component comprises propane.

5. A fractionation process for recovering a vapor containing no more than 10% by volume of hydrocarbons higher-boiling than ethane from a feed stream containing propane and an amount of hydrogen and hydrocarbons lower boiling than propane such that refrigeration means must be used to supply top reflux at a temperature below that attainable by available cooling water in order to keep the concentration of hydrocarbons higher boiling than ethane in the overhead below 10%, which comprises introducing said feed into a fractionation zone at a point intermediate the top and the bottom, maintaining an elevated pressure in said fractionation zone at which propane can be liquified at above atmospheric temperature, imposing a temperature gradient increasing from below atmospheric at the top to above atmospheric at the bottom in said fractionation zone by introducing refrigerant-cooled reflux near the top and introducing reboiled vapors near the bottom, withdrawing all upflowing vapors from said fractionation zone at a point above the point of introducing said feed at which the temperature is above that of available cooling water, partially condensing said withdrawn vapor by heat transfer to cooling water, returning the resulting condensate to the fractionation zone below the point of vapor withdrawal, and returning the noncondensible portion of the withdrawn vapor to the fractionation zone above the point of vapor withdrawal.

6. A fractionation process for recovering liquefied petroleum gas from a hydrocarbon vapor feed containing propane and lower-boiling normally gaseous components comprising introducing said hydrocarbon feed as a vapor into a first fractionation zone operated at elevated pressure at which propane can be liquified at above atmospheric temperature, partially condensing the overhead of said first fractionation zone at a temperature obtainable by cooling water in the surroundings to obtain a first reflux condensate and a gas, introducing said gas into a second fractionation zone operated at elevated pressure at least slightly lower than the pressure in said first fractionation zone, partially condensing the overhead of said second fractionation zone by heat transfer to a refrigerant at a temperature lower than is naturally obtainable in the surroundings to obtain a second reflux condensate and a product gas stream, passing said second reflux condensate to said second fractionation zone, passing said first reflux condensate and a liquid bottom stream from said second fractionation zone to said first fractionation zone, and withdrawing liquid product from the bottom of said first fractionation zone.

7. The method of minimizing refrigeration work in a distillation process comprising a fractionation zone for separating a lower-boiling component from a mixture containing a higher-boiling component, wherein refrigerant cooling is needed to supply top reflux at a temperature below that attainable by available cooling water in order to keep the concentration of higher-boiling component in the overhead below a set maximum, which method comprises introducing said mixture into said fractionation zone at a point where the temperature is above that of available cooling water, withdrawing substantially all upflowing vapor from the fractionation zone at a point above the point of introducing said mixture and at which the temperature is above that of the available cooling water, partially condensing said withdrawn vapor by heat exchange with said cooling water to obtain a condensate and a gas, returning said gas to said fractionation zone at a point just above the point of withdrawal to contact therein downflowing enriched top reflux, and returning said condensate to said fractionation zone at the point of vapor withdrawal.

8. Distillation apparatus comprising in combination (1) a first fractionation zone having a bottoms reboiler, (2) a second fractionation zone having a refrigerant-cooled overhead reflux condenser, (3) means for introducing feed at a lower portion of said first fractionation zone, (4) means for withdrawing all vapor from an upper portion of said first fractionation zone, (5) condensing means comprising cooling water for partially condensing said withdrawn vapor, (6) collecting means comprising a vessel for receiving condensate and uncondensed vapor from said condensing means, (7) means for passing substantially all of said withdrawn vapor not condensed by said condensing means from said vessel to a lower portion of said second fractionation zone, (8) means for passing liquid from a lower portion of said second fractionation zone to said vessel, and (9) means for passing liquid from said vessel to an upper portion of said first fractionation zone.

References Cited by the Examiner

UNITED STATES PATENTS

| | | | |
|---|---|---|---|
| 2,327,643 | 8/1943 | Houghland | 202—75 XR |
| 2,556,833 | 6/1951 | Wall | 62—27 |
| 2,581,051 | 1/1952 | Smith | 202—69 XR |
| 2,600,494 | 6/1952 | Ferro | 62—27 |
| 2,657,243 | 10/1953 | Giraitis | 62—28 |
| 2,666,019 | 1/1954 | Winn. | |
| 2,775,103 | 12/1956 | Koble | 62—28 XR |
| 2,871,275 | 1/1959 | Gerhold | 208—351 |
| 2,916,888 | 12/1959 | Cobb | 62—40 XR |
| 3,109,726 | 11/1963 | Karwat | 62—28 XR |

ROBERT F. BURNETT, *Primary Examiner.*

NORMAN YUDKOFF, *Examiner.*